(12) United States Patent
Wu et al.

(10) Patent No.: US 8,254,093 B2
(45) Date of Patent: Aug. 28, 2012

(54) SLIDING MECHANISM AND ELECTRONIC DEVICE HAVING THE SAME

(75) Inventors: Kun-Tsan Wu, Shindian (TW); Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 244 days.

(21) Appl. No.: 12/784,503

(22) Filed: May 21, 2010

(65) Prior Publication Data

US 2011/0164354 A1 Jul. 7, 2011

(30) Foreign Application Priority Data

Jan. 7, 2010 (CN) .......................... 2010 1 0300107

(51) Int. Cl.
*G06F 1/16* (2006.01)
(52) U.S. Cl. ................................. 361/679.01; 312/323
(58) Field of Classification Search ............. 361/679.01; 312/323
See application file for complete search history.

(56) References Cited

U.S. PATENT DOCUMENTS

| 7,791,867 | B2 * | 9/2010 | Chang et al. ............. 361/679.08 |
| 7,831,286 | B2 * | 11/2010 | Cho et al. .................... 455/575.4 |
| 7,889,037 | B2 * | 2/2011 | Cho ............................... 335/306 |
| 7,907,980 | B2 * | 3/2011 | Cho et al. .................... 455/575.1 |
| 8,019,397 | B2 * | 9/2011 | Cho et al. .................... 455/575.4 |
| 8,029,309 | B2 * | 10/2011 | Ou et al. ........................ 439/374 |
| 8,095,191 | B2 * | 1/2012 | Gorsica et al. ............. 455/575.3 |
| 8,116,834 | B2 * | 2/2012 | Jang et al. .................... 455/575.4 |
| 2007/0133156 | A1 * | 6/2007 | Ligtenberg et al. ............ 361/681 |
| 2007/0153465 | A1 * | 7/2007 | Shih et al. ...................... 361/683 |
| 2008/0139261 | A1 * | 6/2008 | Cho et al. .................... 455/575.4 |
| 2008/0174942 | A1 * | 7/2008 | Yang et al. ...................... 361/680 |
| 2009/0147471 | A1 * | 6/2009 | Francisco et al. ........ 361/679.56 |
| 2009/0170573 | A1 * | 7/2009 | Harmon et al. ............. 455/575.4 |
| 2009/0170574 | A1 * | 7/2009 | Harmon et al. ............. 455/575.4 |
| 2009/0286580 | A1 * | 11/2009 | Murakoso et al. ......... 455/575.4 |
| 2010/0027204 | A1 * | 2/2010 | Chiang .................... 361/679.01 |
| 2010/0046149 | A1 * | 2/2010 | Wang et al. .............. 361/679.01 |
| 2010/0144408 | A1 * | 6/2010 | Chuang et al. ............. 455/575.4 |
| 2010/0194503 | A1 * | 8/2010 | Eromaki ....................... 335/219 |
| 2010/0304803 | A1 * | 12/2010 | Chang et al. ............... 455/575.4 |
| 2010/0309627 | A1 * | 12/2010 | Noma et al. ............ 361/679.58 |
| 2011/0003624 | A1 * | 1/2011 | Jung et al. .................... 455/575.4 |
| 2011/0038105 | A1 * | 2/2011 | Liu et al. .................. 361/679.01 |
| 2011/0051331 | A1 * | 3/2011 | Shi et al. .................. 361/679.01 |
| 2011/0096471 | A1 * | 4/2011 | Ma et al. .................. 361/679.01 |
| 2011/0148782 | A1 * | 6/2011 | Wu et al. ........................ 345/173 |
| 2011/0157781 | A1 * | 6/2011 | Peng ........................ 361/679.01 |
| 2011/0263304 | A1 * | 10/2011 | Laido et al. ................ 455/575.3 |
| 2011/0275422 | A1 * | 11/2011 | Kemppinen ............... 455/575.4 |

FOREIGN PATENT DOCUMENTS

| EP | 1926292 A1 * | 5/2008 |
| JP | 2008170000 A * | 7/2008 |
| JP | 2011142629 A * | 7/2011 |

* cited by examiner

*Primary Examiner* — Lisa Lea Edmonds

(74) *Attorney, Agent, or Firm* — Altis Law Group, Inc.

(57) ABSTRACT

A sliding mechanism comprises a retaining board, a sliding board, a connecting element, a driving assembly. The connecting element is connected between the retaining board and the sliding board, the connecting element is configured for move a portion of the sliding board away from the retaining board. The driving assembly is mounted on the retaining board and the sliding board, the driving assembly being configured to exert attractive force between the retaining board and the sliding board so as to selectively orient the sliding board relative to the retaining board in a close position or an open position.

16 Claims, 6 Drawing Sheets

SLIDING MECHANISM AND ELECTRONIC DEVICE HAVING THE SAME

BACKGROUND

1. Technical Field

The exemplary disclosure generally relates to electronic devices, and particularly to electronic devices having sliding mechanisms.

2. Description of Related Art

A typical slidable portable electronic device, such as a mobile phone, generally includes a cover with a display mounted thereon, a base with a keypad mounted thereon, and a sliding mechanism comprising a retaining plate and a sliding plate slidably mounted to the retaining plate. The cover is mounted to the sliding plate and the base is mounted to the retaining plate, so that the cover can slide relative to the base when the sliding plate moves relative to the retaining plate. However, typically slidable portable electronic device can not provide a mechanism for the cover to slide and also tilt relative to the base.

Therefore, there is room for improvement within the art

BRIEF DESCRIPTION OF THE DRAWINGS

Many aspects of the exemplary sliding mechanism and an electronic device employing the same can be better understood with reference to the following drawings. The components in the various drawings are not necessarily drawn to scale, the emphasis instead being placed upon clearly illustrating the principles of the exemplary sliding mechanism and an electronic device employing the same. Moreover, in the drawings, like reference numerals designate corresponding parts throughout the diagrams.

DETAILED DESCRIPTION

In this exemplary embodiment, the device is an electronic device such as a mobile telephone. The mobile telephone described herein is a representation of the type of wireless communication device that may benefit from the present invention. However, it is to be understood that the present invention may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
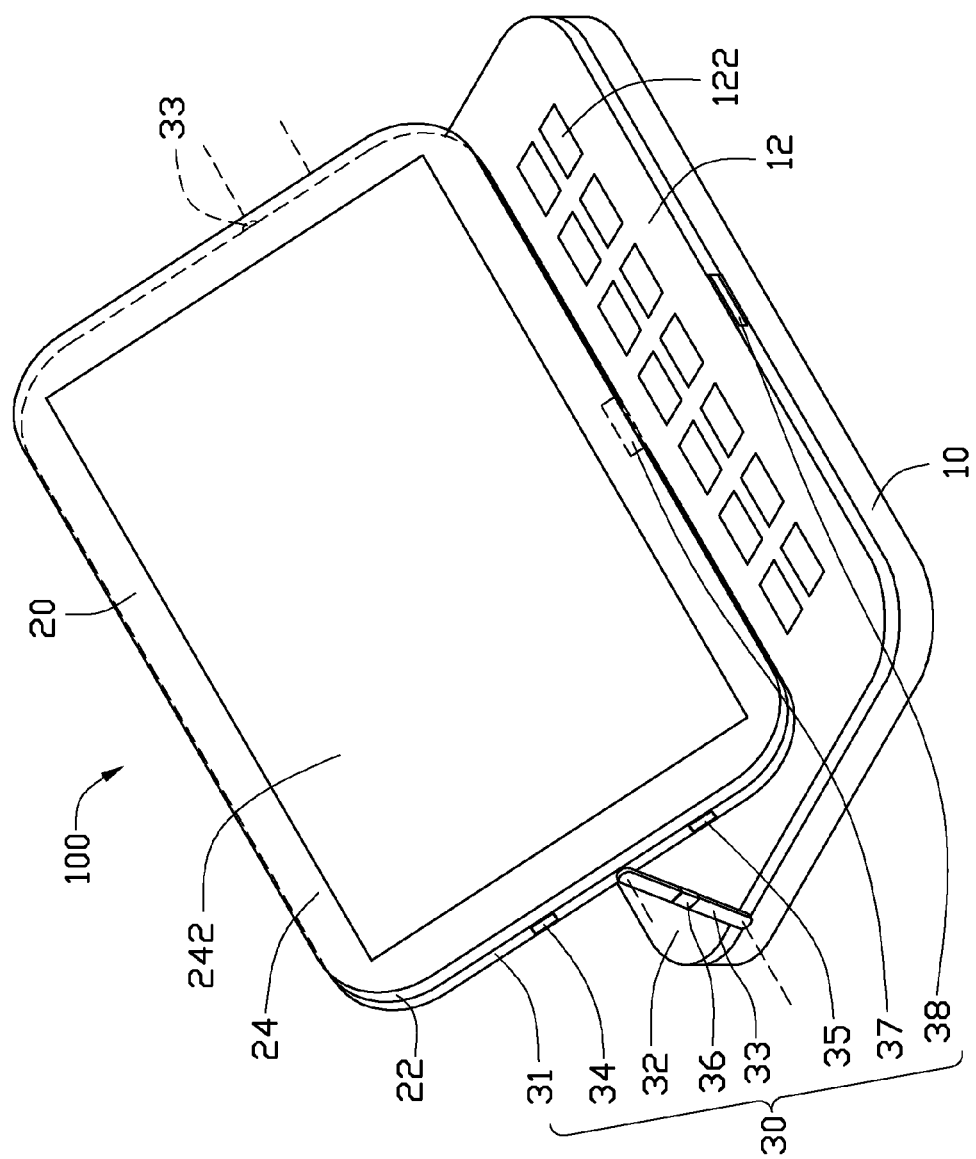
FIG. 1 is a schematic, perspective view of an exemplary electronic device employing a sliding mechanism according to an exemplary embodiment, wherein the electronic device is in an open position.

Referring to FIG. 1, the exemplary electronic device 100, which may be a mobile phone in this case, includes a main body 10, a cover 20 mounted to the main body 10, and a sliding mechanism 30 coupled between the main body 10 and the cover 20. The sliding mechanism 30 includes a sliding board 31, a retaining board 32, two connecting elements 33, two first magnetic elements 34, two second magnetic elements 35, two third magnetic elements 36, a fourth magnetic element 37 and a metallic element 38 (e.g., an iron element). The main body 10 and the cover 20 are connected by the sliding mechanism 30, such that the cover 20 can also be tilted relative to the main body 10 when the cover 20 slides relative to the main body 10. In this exemplary embodiment, the first, second and third magnetic elements 34, 35, 36 create substantially the same magnetic force, but the exposed magnetic pole of the first magnetic elements 34 and the second magnetic elements 35 are opposite to the exposed magnetic poles of the third magnetic elements 36. The connecting element 33 may be an arm member or pole. The exemplary electronic device 100 will be described in more detail below.

The main body 10 is mounted to the retaining board 32 to move with the retaining board 32. The main body 10 includes an upper surface 12 facing the cover 20, and a keypad 122 mounted on the upper surface 12. The cover 20 is mounted to the sliding board 31 to move with the sliding board 31. The cover 20 includes a lower surface 22 facing the main body 10 and a top surface 24 opposite to the lower surface 22. The cover 20 has a display 242, such as a LCD mounted on the top surface 24, for viewing, e.g., data or video. The sliding board 31 and the retaining board 32 are connected by the connecting elements 33, such that the sliding board 31 can be slid and tilted from a closed position 200 shown in FIGS. 2 and/or 3 to an opened position 300 shown in FIG. 6.

Figure 2:
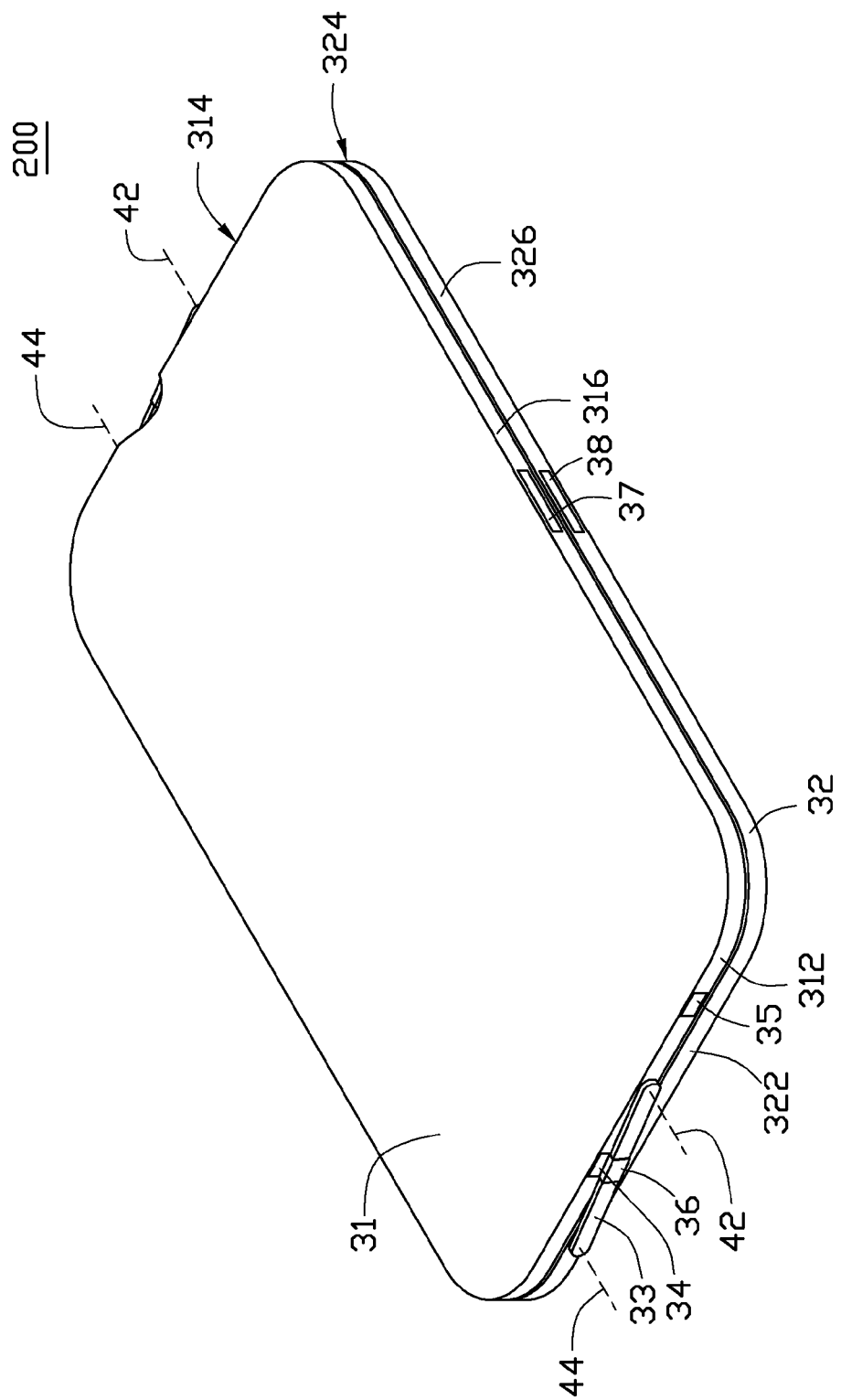
FIG. 2 is a schematic view of the sliding mechanism shown in FIG. 1, but showing the sliding mechanism in a closed position.

Referring to FIG. 2, the sliding board 31 includes a first sidewall 312, a second sidewall 314 opposite to the first sidewall 312 and a third sidewall 316 connecting the first sidewall 312 to the second sidewall 314. The retaining board 32 includes a first side surface 322, a second side surface 324 opposite to the first side surface 322 and a third side surface 326 connecting the first side surface 322 to the second side surface 324. The first, second, third sidewall 312, 314, 316 are corresponding to the first, second, third side surface 322, 324, 326, respectively.

The first sidewall 312 and the first side surface 322 are connected by one of the connecting elements 33, the second sidewall 314 and the second side surface 324 are coupled by the other connecting element 33. Both the first sidewall 312 and the second sidewall 314 have one of the first magnetic elements 34 and one of the second magnetic elements 35 mounted thereon. The fourth magnetic element 37 is mounted on the third sidewall 316 of the sliding board 31, the metallic element 38 is mounted to the third surface 326 of the retaining board 32 corresponding to the fourth magnetic element 37. The fourth magnetic element 37 attracts the metallic element 38 for latching the sliding board 31 to the retaining board 32 in the closed position 200.

One of the connecting elements 33 is pivoted between the first sidewall 312 of the sliding board 31 and the second side surface 322 of the retaining board 32. The other connecting element 33 is pivoted between the second sidewall 314 of the sliding board 31 and the second side surface 324 of the retaining board 32. At this exemplary embodiment, one end of each connecting element 33 is rotatably connected to the sliding board 31 between corresponding first magnetic element 34 and corresponding second magnetic elements 35, by a first shaft 42. The other end of the each connecting element 33 is rotatably connected to the retaining board 32 by a second shaft 44. Each connecting element 33 has one of the third magnetic elements 36 mounted thereon. In the closed position 200, the first magnetic elements 34 are located between the corresponding first shaft 42 and the corresponding second shaft 44, and the first magnetic elements 34 are respectively overlapped with corresponding third magnetic element 36, and the first magnetic elements 34 and corresponding third magnetic element 36 are attracted each other to retain the sliding mechanism 30 in the closed position 200.

Figure 3:
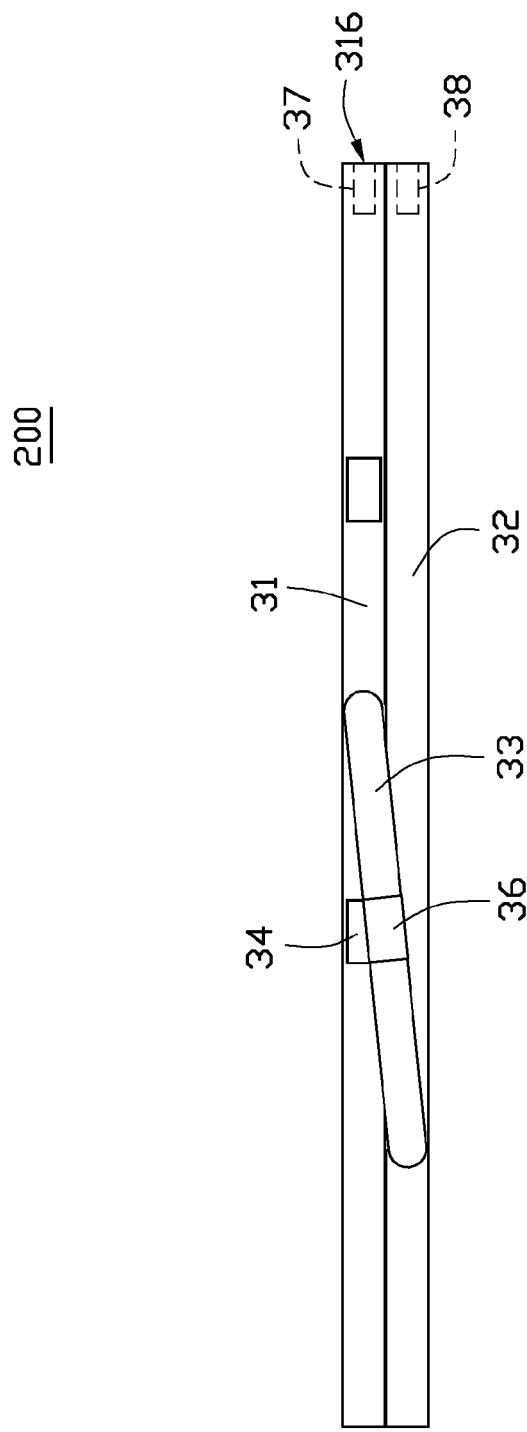
FIG. 3 is an assembled and perspective view of the sliding mechanism shown in FIG. 2, wherein the sliding mechanism is in a close position.
Figure 4:
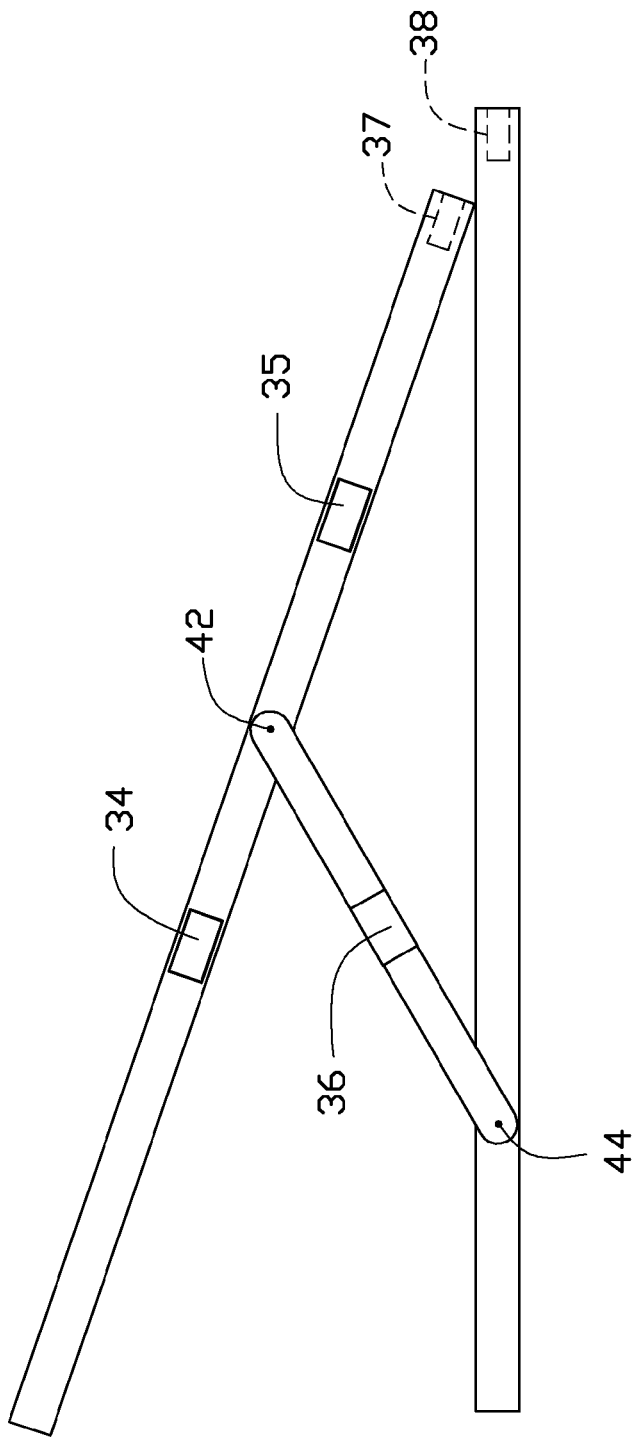
FIGS. 4-6 are similar to FIG. 3, but showing the sliding mechanism in different open position.
Figure 5:
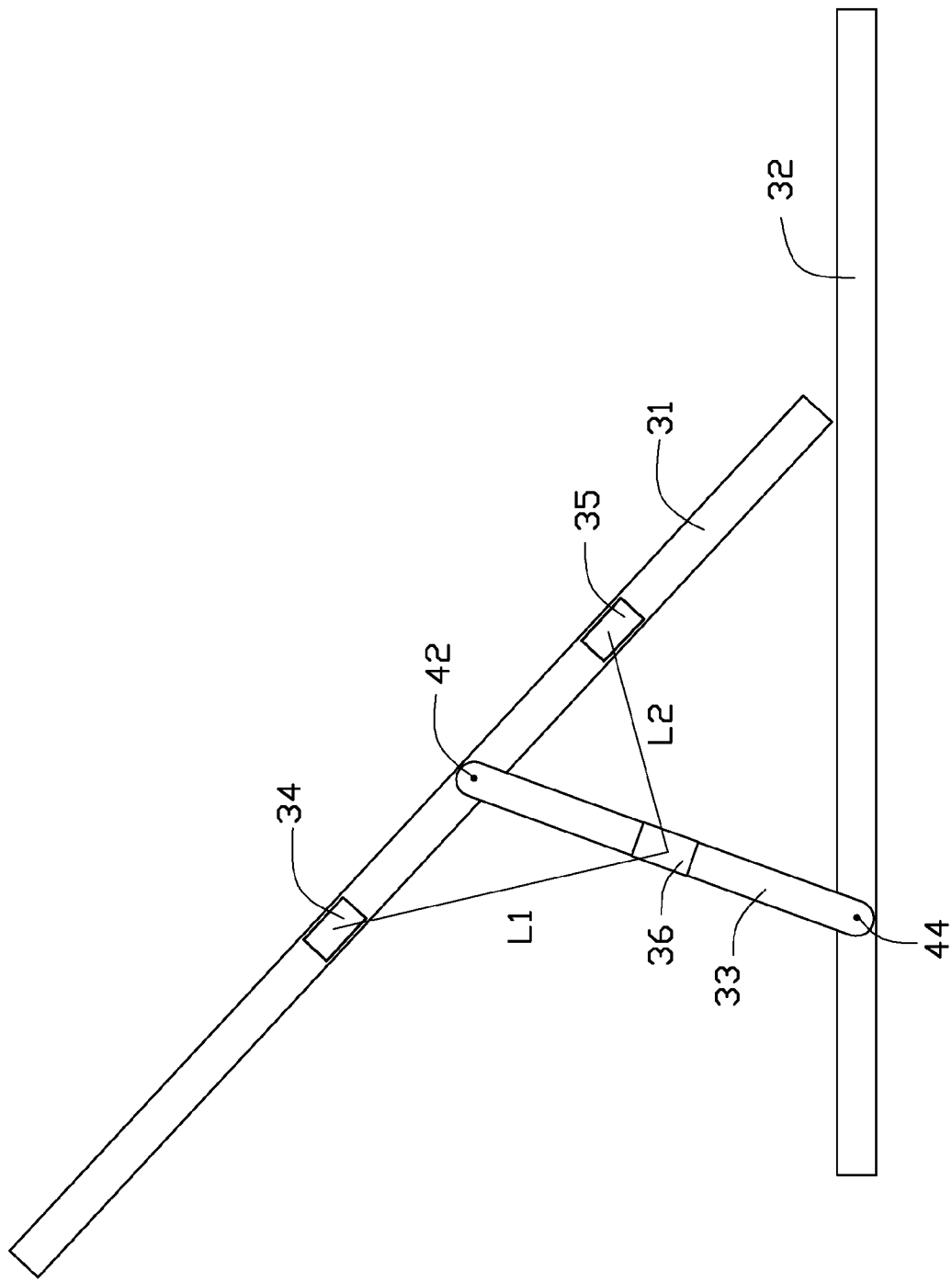
Figure 6:
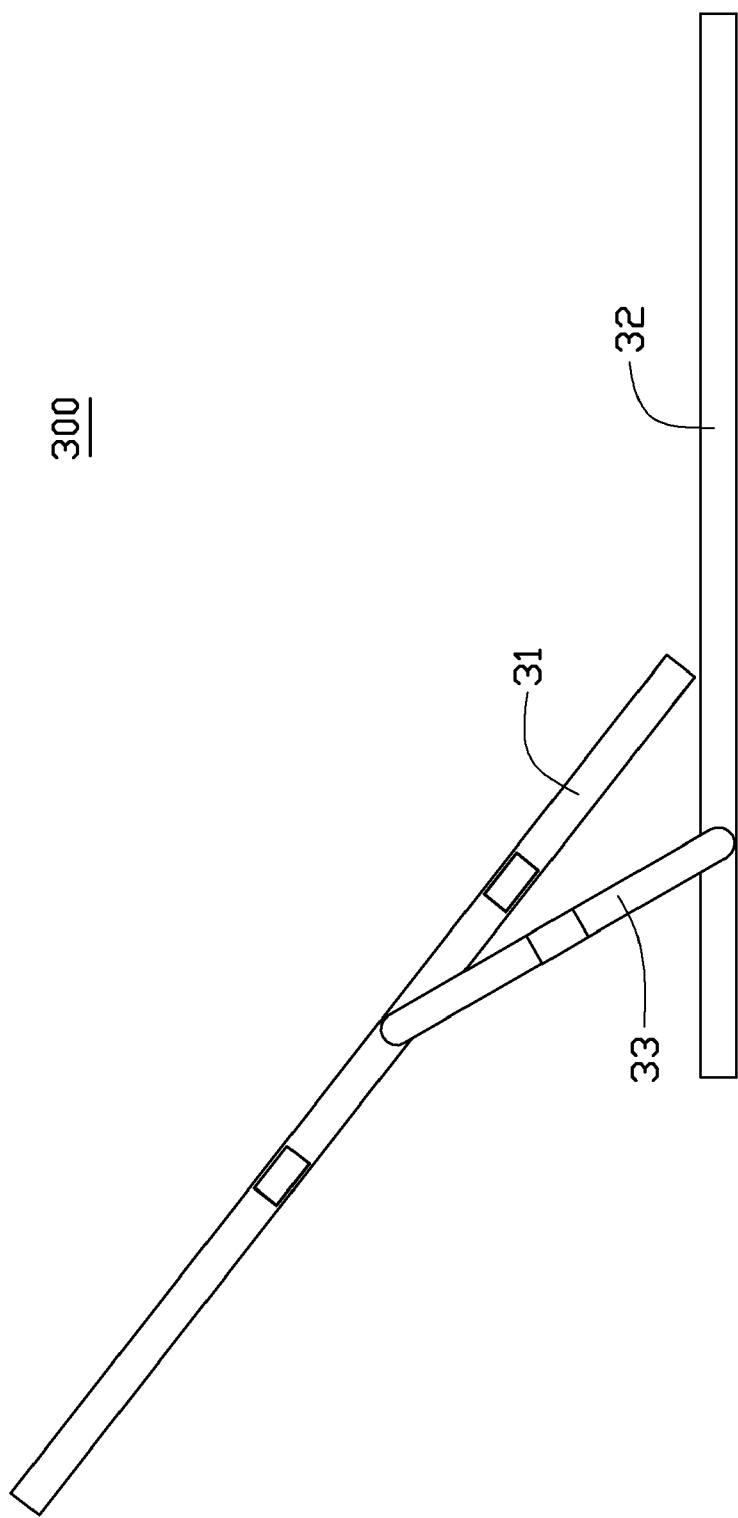

Referring to FIGS. 3 and 6, in use, the sliding board 31 is pushed at the third sidewall 316 to slide relative to the retaining board 32. At this motion, the sliding board 31 is slid relative to the retaining board 32 overcoming the attraction force between the fourth magnetic element 37 and the metallic element 38, and the attraction force between the first magnetic elements 34 and the third magnetic elements 36. The sliding board 31 is rotated about the first shafts 42 and the connecting elements 33 are rotated about the second shafts 44 such that the sliding board 31 is tilted relative to the retaining board 32. The sliding board 31 is continuously pushed until the length L1 (FIG. 5) between the first magnetic elements 34 and corresponding third magnetic element 36 is larger than the length L2 between the second magnetic elements 35 and corresponding third magnetic element 36, i.e., the attraction force between the first magnetic elements 34 and corresponding third magnetic element 36 is smaller than the attraction force between the second magnetic elements 35 and corresponding third magnetic element 36. After that, under the attraction force between the second magnetic elements 35 and corresponding third magnetic element 36, the sliding board 31 automatically slides relative to the retaining board 32, and the sliding board 31 automatically rotates about the first shafts 42 with the connecting elements 33 rotated about the second shafts 44, until the sliding board 31 is located in the opened position 300. It is to be understood that the sliding mechanism 30 may include a retaining member coupled between the sliding board 31 and the retaining board 32 for firmly retaining the sliding board 31 in the opened position.

As mentioned above, the cover 20 is mounted to the sliding board 31 and the main body 10 is mounted to the retaining board 32, such that the cover 20 can be slid and tilted relative to the main body 10 for better viewing of the display 242 when the sliding board 31 is slid and tilted relative to the main body 10 from the closed position 200 to the opened position 300. In this exemplary embodiment, the first magnetic element 34, the second magnetic elements 35 and the third magnetic element 36 may be integrated into a driving assembly. The driving assembly is configured to exert attractive force between the retaining board and the sliding board so as to selectively orient the sliding board relative to the retaining board in a close position or an open position.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A sliding mechanism, comprising:
    a retaining board;
    a sliding board mounted to the retaining board and relatively slidable therewith, the sliding board comprising a first magnetic element and a second magnetic element spacingly mounted thereon;
    a connecting element pivotably connecting the retaining board and the sliding board;
    a third magnetic element mounted to the connecting element;
    wherein when the sliding mechanism in a closed position, the first magnetic element and the third magnetic element are attracted each other to retain the sliding mechanism in the closed position; when the sliding board slides relative to the retaining board, the connecting element tilts the sliding board relative to the retaining board, a first attraction force between the first magnetic element and the third magnetic element gradually decreases, and a second attraction force between the second magnetic element and the third magnetic element gradually increases; when the second attraction force is larger than the first attraction force, the sliding board then automatically rotates relative to the connecting element and slides relative to the retaining board under the second attraction force until the sliding mechanism is in an opened position.

2. The sliding mechanism as claimed in claim 1, further comprising a first shaft pivotably connecting the connecting element to the sliding board and a second shaft pivotably connecting the connecting element to the retaining board; the first magnetic element located between the first shaft and the second shaft when the sliding mechanism is in the closed position.

3. The sliding mechanism as claimed in claim 1, wherein the orientation of the magnetic poles of the first magnetic element is the same as that of the second magnetic element, the orientation of the magnetic poles of the third magnetic element is opposite to that of the magnetic poles of the first magnetic element.

4. The sliding mechanism as claimed in claim 3, wherein the first magnetic element partially overlaps with the third magnetic element when the sliding mechanism is in the closed position.

5. The sliding mechanism as claimed in claim 1, wherein the sliding mechanism further includes a fourth magnetic element mounted on the sliding board, and a metallic element mounted on the retaining board, the fourth magnetic element and the metallic element are attracted each other to retain the sliding mechanism in the closed position.

6. The sliding mechanism as claimed in claim 1, wherein the sliding mechanism further includes another first magnetic element, another second magnetic element, another third magnetic element and another connecting element; the another connecting element pivotably connected between the retaining board and the sliding board; the another first magnetic element and the another second magnetic element are spacingly mounted to the sliding board, the another third magnetic element is mounted to the another connecting element.

7. An electronic device, comprising:
    a cover;
    a main body; and
    a first magnetic element and a second magnetic element spacingly mounted on the cover;
    a connecting element pivotably connected between the cover and the main body;
    a third magnetic element mounted to the connecting element;
    wherein when the electronic device in a closed position, the first magnetic element and the third magnetic element are attracted each other to retain the electronic device in the closed position; when the cover slides relative to the main body, the connecting element tilts the cover relative to the main body, a first attraction force between the first magnetic element and the third magnetic element is gradually decreased, and a second attraction force between the second magnetic element and the third magnetic element is gradually increased; when the second attraction force is larger than the first attraction force, the cover then automatically rotates relative to the connecting element and slides relative to the main body under the second attraction force until the electronic device located in an opened position.

8. The electronic device as claimed in claim 7, further comprising a sliding board fixed to the cover and a retaining board fixed to the main body, the first and the second magnetic elements are spaceingly mounted on the sliding board, the connecting element pivotably to the sliding board and the retaining board respectively.

9. The electronic device as claimed in claim 7, wherein the orientation of the magnetic poles of the first magnetic element is the same as that of the second magnetic element, the orientation of the magnetic poles of the third magnetic element is opposite to that of the magnetic poles of the first magnetic element.

10. The electronic device as claimed in claim 9, wherein the first magnetic element partially overlaps with the third magnetic element when the sliding mechanism is in the closed position.

11. The electronic device as claimed in claim 7, wherein the sliding mechanism further includes a fourth magnetic element mounted on the sliding mechanism, and a metallic element mounted on the retaining mechanism, the fourth magnetic element and the metallic element are attracted each other to retain the sliding mechanism in the closed position.

12. The electronic device as claimed in claim 7, wherein the electronic device further includes another first magnetic element, another second magnetic element, another third magnetic element and another connecting element; the another connecting element pivotably connected between the retaining board and the sliding board; the another first magnetic element and the another second magnetic element are spacingly mounted to the sliding board, the another third magnetic element is mounted to the another connecting element.

13. A sliding mechanism, comprising:
a retaining board;
a sliding board
a connecting element connected between the retaining board and the sliding board, the connecting element configured for move a portion of the sliding board away from the retaining board;
a driving assembly mounted on the retaining board and the sliding board, the driving assembly being configured to exert attractive force between the retaining board and the sliding board so as to selectively orient the sliding board relative to the retaining board in a close position or an open position;
wherein the sliding mechanism further includes a fourth magnetic element mounted on the sliding mechanism, and a metallic element mounted on the retaining mechanism, the fourth magnetic element and the metallic element are attracted each other to retain the sliding mechanism in the closed position.

14. The sliding mechanism as claimed in claim 13, wherein the driving assembly comprises a first and a second magnetic element spacingly mounted on the sliding board, and a third magnetic mounted on the connecting element, the first magnetic element has the same magnetic pole as the magnetic pole of the second magnetic element, the magnetic pole of the third magnetic element is opposite to the magnetic pole of the first magnetic element.

15. The sliding mechanism as claimed in claim 14, wherein the first magnetic and the third magnetic are attracted each other to retain the sliding mechanism in a closed position; when the sliding board slides relative to the retaining board, the connecting element tilts the sliding board relative to the retaining board, the attraction force between the second magnetic element and the third magnetic element is gradually enlarged for the sliding board to slid automatically relative to the retaining board until the sliding mechanism located in an opened position.

16. The sliding mechanism as claimed in claim 15, wherein the first magnetic element is partially overlapped with the third magnetic element when the sliding mechanism is in the closed position.

* * * * *